Figure 1:
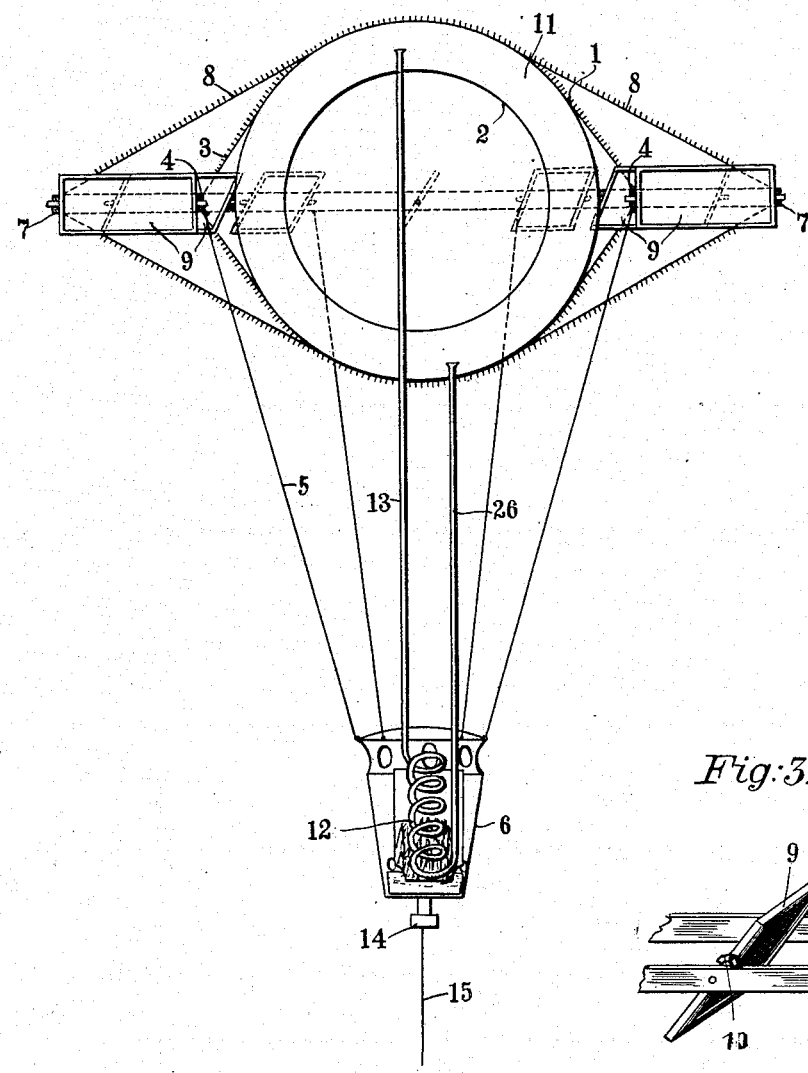

No. 674,427. Patented May 21, 1901.
A. PALENCSÁR.
APPARATUS FOR COLLECTING ATMOSPHERIC ELECTRICITY.
(Application filed July 10, 1900.)
(No Model.) 3 Sheets—Sheet 1.

WITNESSES:
INVENTOR
Andor Palencsár
ATTORNEYS

No. 674,427. Patented May 21, 1901.
A. PALENCSÁR.
APPARATUS FOR COLLECTING ATMOSPHERIC ELECTRICITY.
(Application filed July 10, 1900.)
(No Model.) 3 Sheets—Sheet 2.

No. 674,427. Patented May 21, 1901.
A. PALENCSÁR.
APPARATUS FOR COLLECTING ATMOSPHERIC ELECTRICITY.
(Application filed July 10, 1900.)
(No Model.) 3 Sheets—Sheet 3.
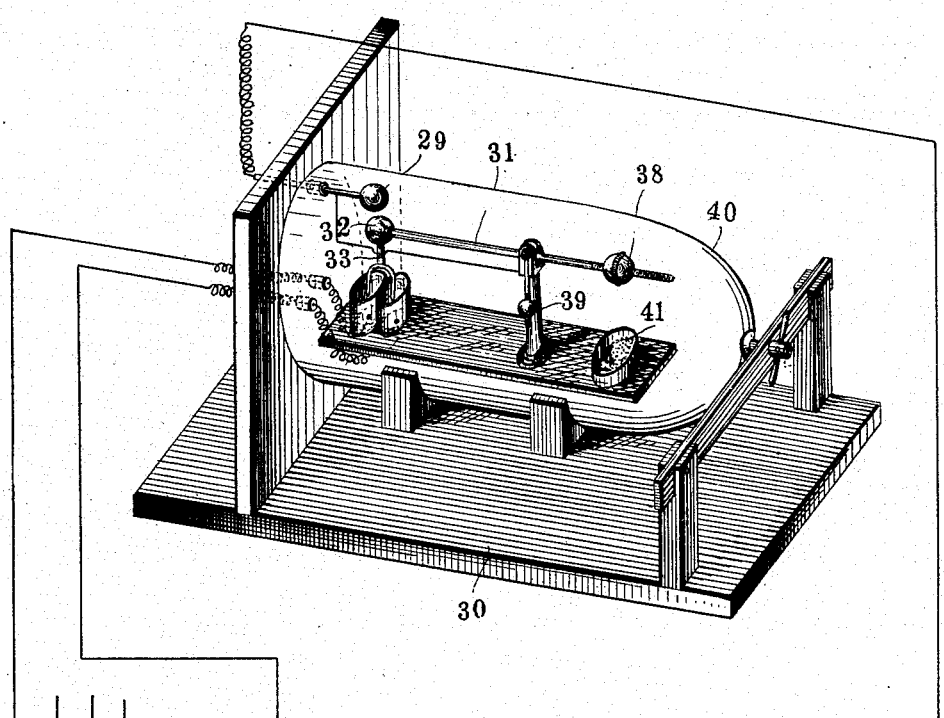
*Fig. 4.*
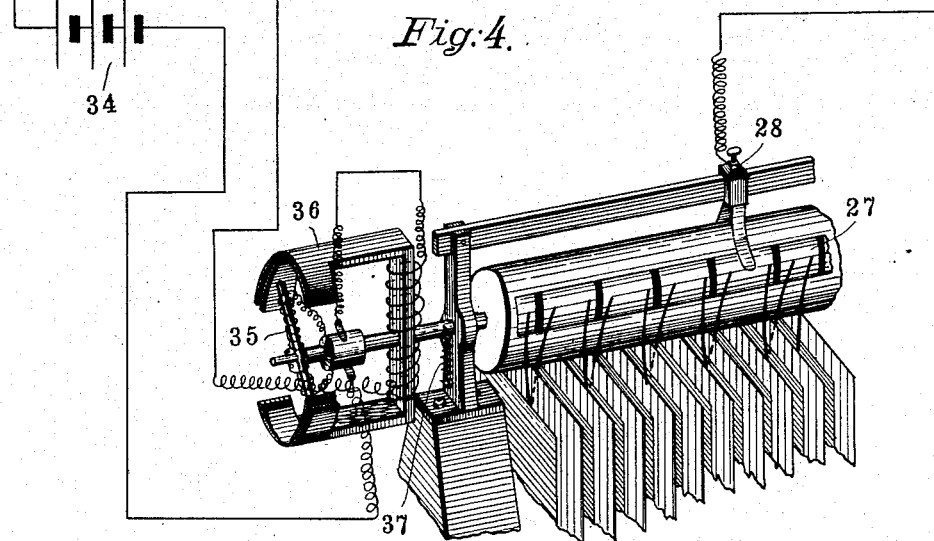
WITNESSES:
Ella L. Giles
[signature]
INVENTOR
Andor Palencsár
BY
Richardson
ATTORNEYS

UNITED STATES PATENT OFFICE.

ANDOR PALENCSÁR, OF BUDA-PESTH, AUSTRIA-HUNGARY.

APPARATUS FOR COLLECTING ATMOSPHERIC ELECTRICITY.

SPECIFICATION forming part of Letters Patent No. 674,427, dated May 21, 1901.

Application filed July 10, 1900. Serial No. 23,102. (No model.)

*To all whom it may concern:*

Be it known that I, ANDOR PALENCSÁR, a subject of the King of Hungary, residing at Buda-Pesth, Austria-Hungary, have invented a certain new and useful Apparatus for Collecting Atmospherical Electricity, of which the following is a full, clear, and exact specification.

The present invention concerns an apparatus for collecting and driving or conducting atmospherical electricity which renders it practicable to obtain material quantities of the same in serviceable form.

The experiments made hitherto have been limited to deviating or conducting the electricity by simple lightning-rods without making allowance for the progress of the theory of atmospherical electricity. It is obvious that only extremely small quantities of electricity can be collected in this manner, and, moreover, it was obtained in a form which entirely precluded its utilization. It is evident that a source of electricity of irregular yield can only be utilized by means of accumulators and for charging accumulators only a current of constant potential can be employed. The potential of electricity derived or deviated by means of a lightning-rod varies within wide limits, and, moreover, it is so high that it cannot be used at all for charging accumulators. All these drawbacks are remedied by the present invention, by which the atmospheric electricity is obtained in larger quantities with as low and constant a potential as may be desired.

The idea underlying the invention is based on the modern theory of atmospheric electricity, according to which it is produced by the condensation of steam or aqueous vapors, and that the increase of potential is effected by the concentration of the small drops of water into larger ones, as the proportion of the surface of the drops to the volume of same is materially reduced thereby. According to this theory the water-droplets floating in the layers of air are considered as vehicles or carriers of the electricity, and a rational system of the deviation of the atmospheric electricity must derive it from the water-drops. This is attained by the present invention in the following manner: A collecting-body of as large a surface as possible is provided with sharp needles. This is moved in the higher layers of air, while being continually heated by a suitable heating device. Owing to the heat the water-drops immediately ambient to the collecting-body will be evaporated, their capacity is gradually reduced, while the potential of the charge grows until it reaches an infinite height with infinite smallness of the drops. It is readily apparent that the whole charge of the drops as soon as they have been evaporated will have passed to the collector or collecting-body, from which it can be conducted. For the purpose of replacing the evaporated drops, which have been deprived of their charge by new-charged drops, the collector is moved in relation to the ambient air.

One way of carrying out the invention is represented in diagram in the accompanying drawings, in which—

Figure 3:
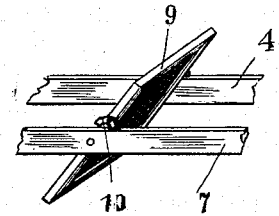
Figure 2:
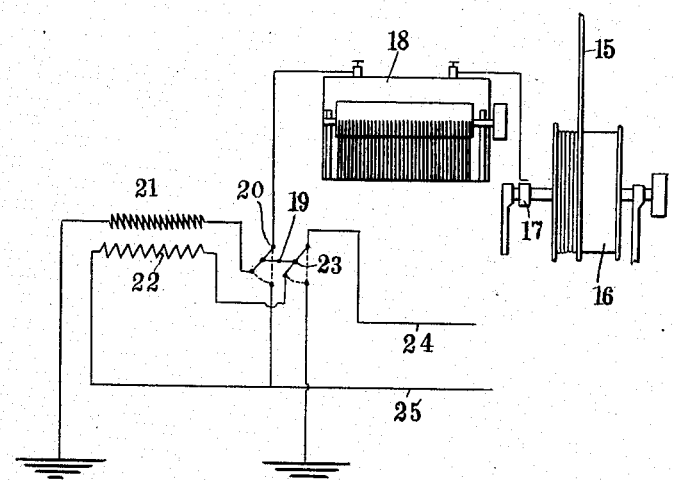

Figure 1 is a longitudinal section of the collecting-balloon. Fig. 2 shows the deviating and conversion device, and Fig. 3 a detail. Fig. 4 is a diagrammatic perspective view of a form of automatic regulator for the rheostatic machine.

The apparatus consists of a balloon having two walls and covered with a light wire net, preferably of aluminium wire, said net being studded with needles. Besides, the balloon carries the net 3, on which the ring 4, made of a solid but light material, (wood, cane, &c.,) is fixed. This ring carries the basket 6 by means of the cords or ropes 5. On a level with the ring 4 is the ring 7, which is kept spread by the blades or wings 9, which are journaled in a manner to rotate easily. The ring 7 is kept fixedly in position by the cords or ropes 8. The blades or wings consist of a frame covered with light material, and their rotation in either direction is limited by the stops or ledges 10. The blades or wings form advantageously an angle of sixty to seventy degrees with the vertical line.

All wire nets, ropes, rings, and blades or wings may be covered with small metal needles which are electrically connected with each other.

From the space 11, formed between the double walls of the balloon, the pipe 26 leads from the lowest point of the same to the serpentine 12, arranged in the basket 6, which in turn is connected with the pipe 13, ending in the upper part of the space 11 between the two walls 12. The serpentine is heated by means of a suitable source of heat, whereby a warm current of gas or air circulates continually between the double walls of the balloon.

Under the basket the ball-bearing 14 is arranged in electrical connection with the wire nets, and its stud is electrically connected with the carefully-insulated light though sufficiently strong cable 15.

On the earth's surface is a winch 16, Fig. 2, by means of which the balloon can be made to ascend or descend as soon as the interior space of the balloon is filled with illuminating gas or hydrogen.

The end of the cable-core is soldered to a collector arranged upon and insulated from the axle of the winch, and the electricity is conducted from this collector by means of a sliding contact. The collecting of the electricity takes place by moving the balloon continuously up and down by means of the winch. In this movement the balloon is turned by means of the wings or blades 9, which are adapted to turn the balloon always in the same direction whether ascending or descending, as in the change from ascending into descending of the balloon, or vice versa, the blades are turned over by the aerial resistance, and thus impart the rotating motion to the balloon in the same direction. In order to avoid torsion of the cable, the ball-bearing 14 is provided. This up-and-down motion and rotating of the balloon accomplishes the purpose of bringing it into contact with as many water particles floating in the air as possible.

As the electricity conducted from the collector-wing 17 possesses a much too high and varying potential for making its direct application practicable, and as it is usual with an irregular source of electricity to first charge accumulators and to further utilize the easily-regulated current of the same only, it becomes necessary to seek to maintain the electricity conducted from the collector 17 for the charging of the accumulators at a constant potential and convert the potential to a much lower one; but as we deal in this case with a direct current ordinary converters cannot be used for this purpose. Moreover, the electricity possesses in this case a much too high potential, so that with the employment of ordinary converters the greatest part of the collected electricity would be lost again. The only practical method for this purpose is the converting by means of the Planté rheostatic machine, by which this high-voltage electricity can be transformed almost without any loss whatever. Thus the question of conversion would be solved, and only the question of maintenance of constant potential remains. This is obtained in the following manner: The rheostatic machine 18 or only a part of the plates is connected with an electrometer of any construction, the movable part of which closes a contact which eventually actuates an electromagnet which effects the switching or reversion of the rheostatic machine. After the switching of the rheostatic machine it is discharged, the potential falls to zero, (nil,) and the electrometer resumes its initial position, whereby the current of the electromagnet which effects the reversion is interrupted and the plates of the rheostatic machine are reconnected to potential. The machine is then ready for renewed charge and is again discharged when the determined potential is reached. This action is continually repeated as long as the apparatus is in operation.

A form of the automatic regulator for the rheostatic machine is represented in Fig. 4. 27 is the contact-cylinder of the rheostatic machine, on which, for clearness sake, only the contacts for the charging position of the condenser-plates are shown, while the contacts for the discharging position, which come into action after the contact-cylinder has been turned, are omitted. The coating of the condenser-plates is connected in electrical circuit with the stationary ball 29 and the movable ball 32 of the charge-meter 30. When the charge of the rheostatic machine rises, the ball 32, arranged on the one extremity of the lever 31, is repelled and at a certain stroke actuated by means of the fork 33, which is fastened on the ball 32, and by dipping into a mercury-cup it closes the circuit of the source of current 34. This current passes through the windings of the anchor or armature 35, fixed on the shaft of the contact-cylinder, and it also passes through the electromagnet 36. Thereby the contact-cylinder is turned by a certain angle and the rheostatic machine is thus reversed. Then if the tension decreases by discharge and the repulsion of the balls 29 32 declines so far that the contact is interrupted at 33 the spring 37 turns the contact-cylinder into its normal position and the rheostatic machine is again switched to tension. The regulation of the electrometer is effected by the adjustable weights 38 39. When larger quantities of electricity shall be derived or deviated, two rheostatic machines may operate alternately so, that while the one is being discharged the other can be charged. It is readily apparent that if the capacity of the rheostatic machine is not changed the switching or reversion by the electrometer will always take place at the same potential of the rheostatic machine, and as the number of plates, and hence the proportion of conversion, remains the same the current impulses derived or deviated from the rheostatic machine will also have the same potential.

The irregularities of the source of electricity change the interval of time in which the charges follow each other; but as long as the potential remains constant this has no injurious effect on the charge of the accumulators. The current derived, or deviated from the rheostatic machine can be further transformed by an ordinary converter 21 22, and whenever it is sufficiently constant it can be utilized without the intervention of the accumulators. The converters can be connected or disconnected by means of the double switch 19 20 23.

24 and 25 are the conducting-wires, which run either directly to the place of consumption or to an accumulator-battery.

Having now described my invention, what I claim as new, and desire to secure by Letters Patent, is—

1. An apparatus for collecting atmospheric electricity comprising a collecting-body adapted to be kept in motion, heating means for said body, and a rheostatic machine and a converter connected with the said body electrically, substantially as described.

2. An apparatus for collecting atmospheric electricity for storage comprising a collecting-body adapted to be kept in motion in the ambient air, heating means for said body, a conductor leading from said body, a rheostatic machine connected with the said conductor, an electrometer connected with said rheostatic machine electrically, a contact controlled by the electrometer, and an electromagnet controlled by said contact, said electromagnet controlling the reversing of the rheostatic machine, substantially as described.

3. In combination, the balloon-like collecting-body, having the collecting-points, means for heating the interior space of said body, a conductor leading from the balloon-like body, and electrical devices for receiving the current therefrom, substantially as described.

4. In combination, the balloon-like collecting-body, means for turning the same constantly in one direction in both ascending and descending, conducting means leading from the balloon and electrical devices for receiving the current therefrom, substantially as described.

In witness whereof I have hereunto set my hand in presence of two witnesses.

ANDOR PALENCSÁR.

Witnesses:
EUGÈNE HARRÄNJO,
PAUL BÖLESKEY.